March 10, 1959 D. J. GIMPEL 2,877,457
METHOD AND APPARATUS FOR PRESENTING THREE-DIMENSIONAL
REPRESENTATION OF VOLTAGES
Filed April 22, 1952 6 Sheets-Sheet 1

INVENTOR.
Donald J. Gimpel
BY
Mann, Brown and Hausmann
Attys.

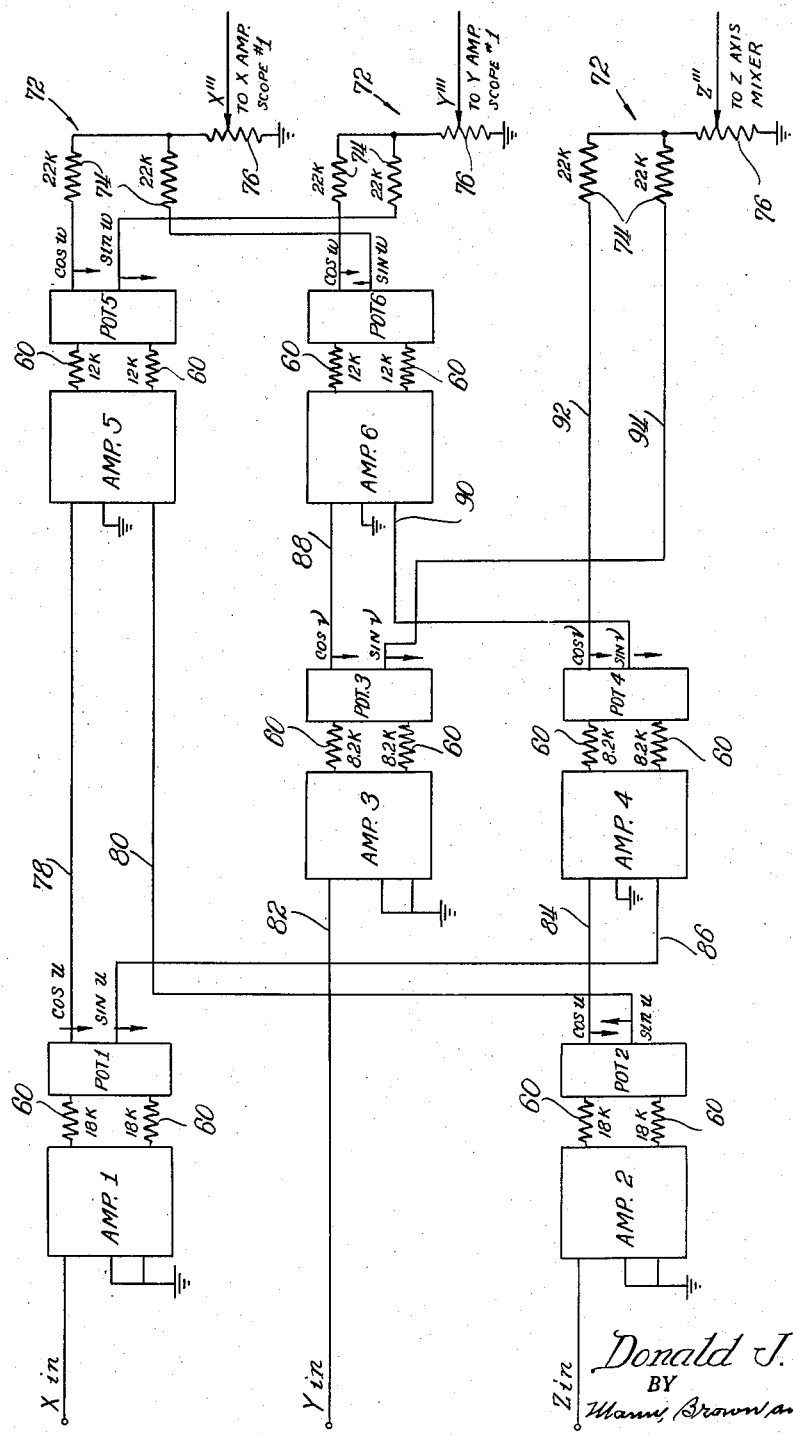

March 10, 1959  D. J. GIMPEL  2,877,457
METHOD AND APPARATUS FOR PRESENTING THREE-DIMENSIONAL
REPRESENTATION OF VOLTAGES
Filed April 22, 1952  6 Sheets-Sheet 3
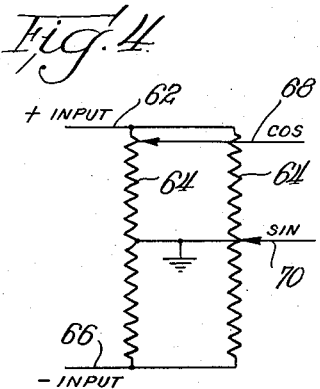
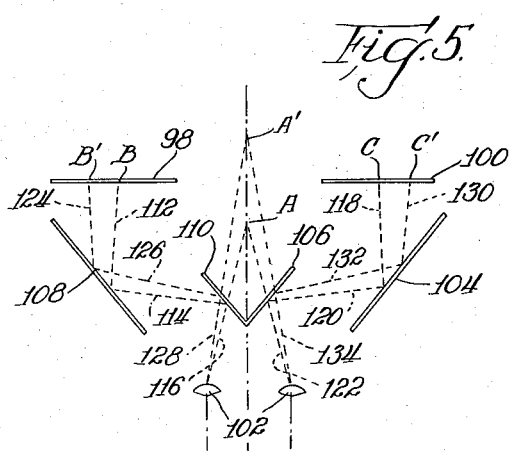
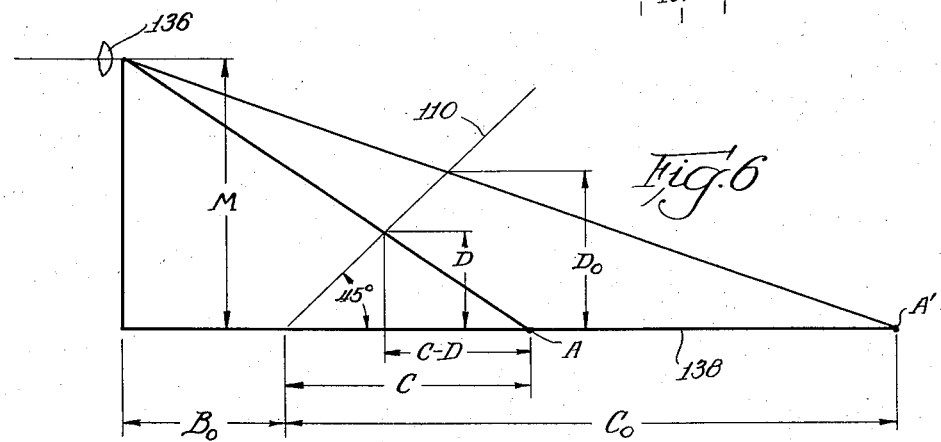
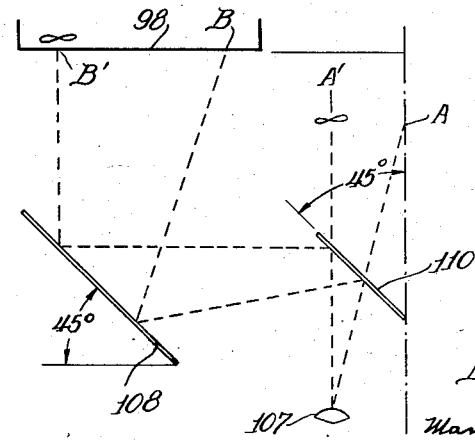
INVENTOR.
Donald J. Gimpel
BY
Mann, Brown and Hansmann
Att'ys.

March 10, 1959 D. J. GIMPEL 2,877,457
METHOD AND APPARATUS FOR PRESENTING THREE-DIMENSIONAL
REPRESENTATION OF VOLTAGES
Filed April 22, 1952 6 Sheets-Sheet 4

$$D = \frac{1.25C}{1.25 + B_0 + C}$$

Variation of the output Voltage of Z axis-mixer

INVENTOR.
Donald J. Gimpel
BY
Mann, Brown and Hartmann
Attys.

March 10, 1959

D. J. GIMPEL 2,877,457

METHOD AND APPARATUS FOR PRESENTING THREE-DIMENSIONAL
REPRESENTATION OF VOLTAGES

Filed April 22, 1952

INVENTOR.
Donald J. Gimpel
BY
Mann, Brown and Hansmann
Att'ys

March 10, 1959  D. J. GIMPEL  2,877,457
METHOD AND APPARATUS FOR PRESENTING THREE-DIMENSIONAL
REPRESENTATION OF VOLTAGES
Filed April 22, 1952  6 Sheets-Sheet 6
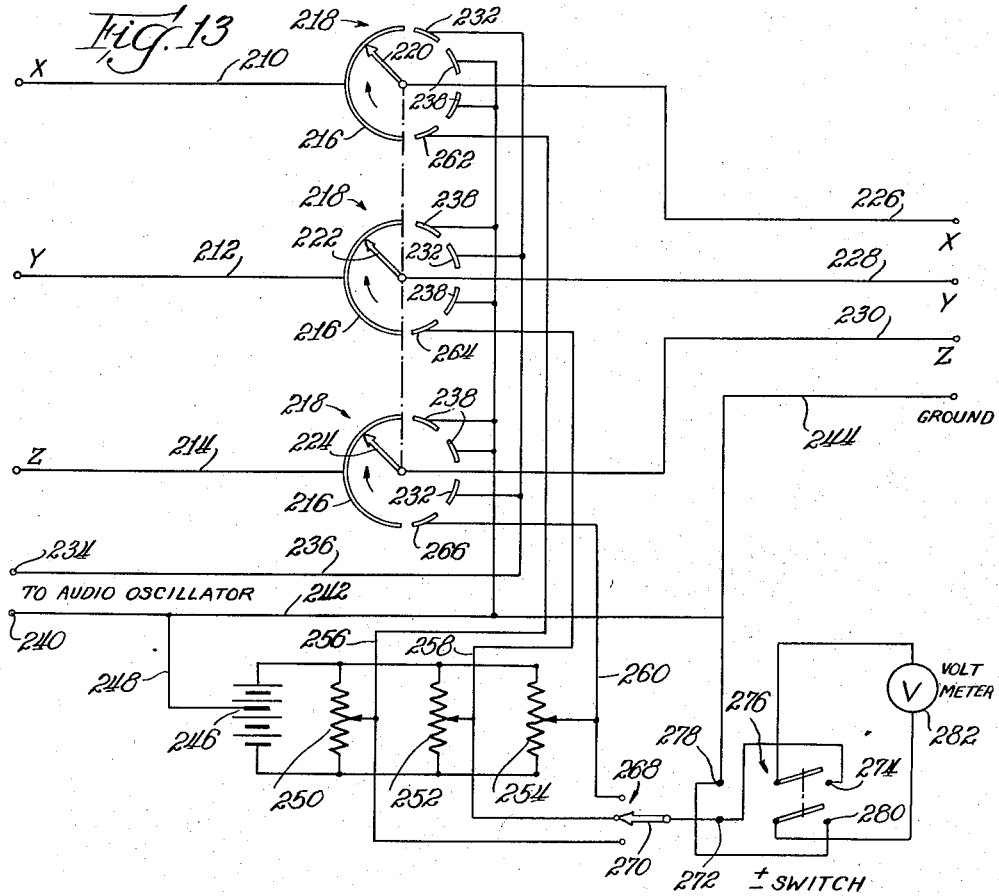
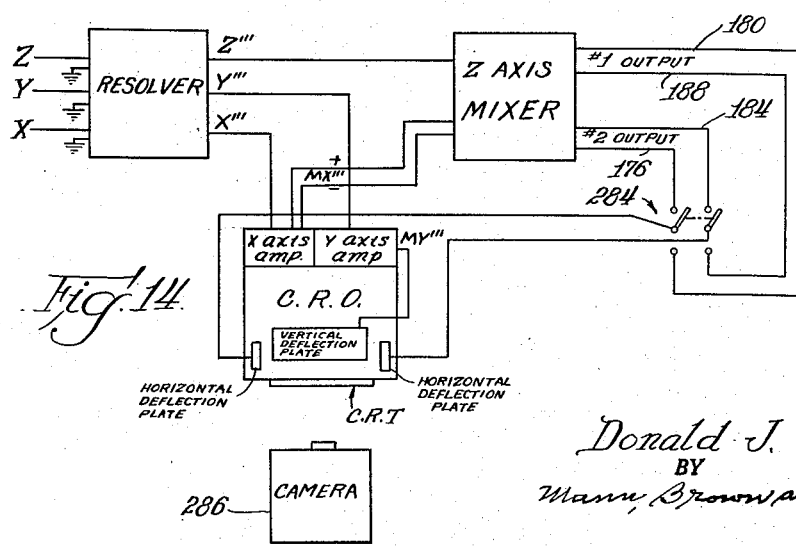
INVENTOR.
Donald J. Gimpel
BY
Mann, Brown and Hausmann
Attys.

United States Patent Office 2,877,457
Patented Mar. 10, 1959

2,877,457

METHOD AND APPARATUS FOR PRESENTING THREE-DIMENSIONAL REPRESENTATION OF VOLTAGES

Donald J. Gimpel, Chicago, Ill., assignor to Harry S. Nichols, Detroit, Mich.

Application April 22, 1952, Serial No. 283,778

11 Claims. (Cl. 340—324)

My invention relates to a method and apparatus for presenting a three-dimensional representation of voltages. The world is three dimensional, and the only way in which an intuitive understanding of the meaning of a line oriented in space, object or surface can be had is to present the line, object or surface as having depth as well as height and width. When a line, object or the like is viewed as being oriented in space, i. e., having three dimensions, the eye and mental mechanisms apprise the viewer of its true characteristics, whereas merely viewing the line, object or the like in two dimensions not only does not give an intuitive feeling for its characteristics, but often gives a misconception of them.

Heretofore it has been the practice to produce two-dimensional traces on cathode-ray tubes. While two-dimensional representations may serve to picture a wave of a single frequency on a cathode-ray tube, when complex voltages are depicted on the cathode-ray tube as a two-dimensional picture, the viewer often cannot perceive the true meaning of the picture. While it is sometimes possible to analyze the two-dimensional picture of the complex voltages and ultimately determine the true characteristics so that the voltages may be evaluated, no intuitive feeling is had for the characteristics of the voltage wave pattern.

Often it is relatively easy to obtain a pictorial representation of the complex voltages, but the great difficulty is to present the representation in a manner which may be significantly grasped by the human mind. As an example, if complex voltages representing a line spirally wrapped around a cylinder were connected to a cathode-ray tube for a two-dimensional representation, the trace produced would be that of a periodic wave form if the spiral extended along the x-axis, or simply as a circle if the spiral extended perpendicular to the x-axis. If the voltages were connected to a cathode-ray tube or tubes so as to produce a three-dimensional picture, as will be hereinafter explained, the trace on the cathode-ray tube or tubes will reproduce the spatial orientation of the spiral line.

My invention broadly contemplates producing a three-dimensional representation of voltages with one or more cathode-ray tubes, which representation may be moved in space and/or revolved in space to thereby more clearly present the configuration of the representation, and which representation may be viewed directly with a simple mirror stereoptic system or photographed by means of a conventional camera or a stereoptic camera. Means are provided to trace the three coordinate axes of space on the representation, to enhance the visualization of depth by electrically shading the representation, and to permit the reading of the coordinates of any point in the three-dimensional representation.

Accordingly, it is an object of my invention to provide a method and apparatus for producing a three-dimensional representation of voltages.

Another object of my invention is to provide a method and apparatus for presenting a three-dimensional representation of voltages that may be rotated in space.

Other objects of my invention are to provide a method and apparatus for presenting a three-dimensional representation of voltages which is relatively simple to construct and maintain, which produces an image that may be increased or decreased in size, may be shaded to enhance the visualization of depth, may have traced thereon the coordinate axes, may have a movable coordinate reading spot produced therein, and can be moved over a wide range of apparent depth.

These and other objects and advantages will become apparent as the following description is read in conjunction with the attached drawings, in which:

Figure 2 is a block diagram of the resolver circuit;

Figure 4 is a schematic diagram of one of the potentiometers of the resolver circuit;

Figure 5 is a plan view of the stereoscopic system shown in Figure 1;

Figure 6 is a diagrammatic view of part of the stereoscopic system and is lettered to indicate the symbols used in developing the equation of convergence;

Figure 7 is a plan view of one-half of the stereoscopic system shown in Figure 1;

Figure 13 is a schematic diagram of the combined spot position indicator and axis tracer; and Figure 14 is a block diagram plan view of a modified form of my invention wherein only one cathode-ray tube is used.

Figure 1:
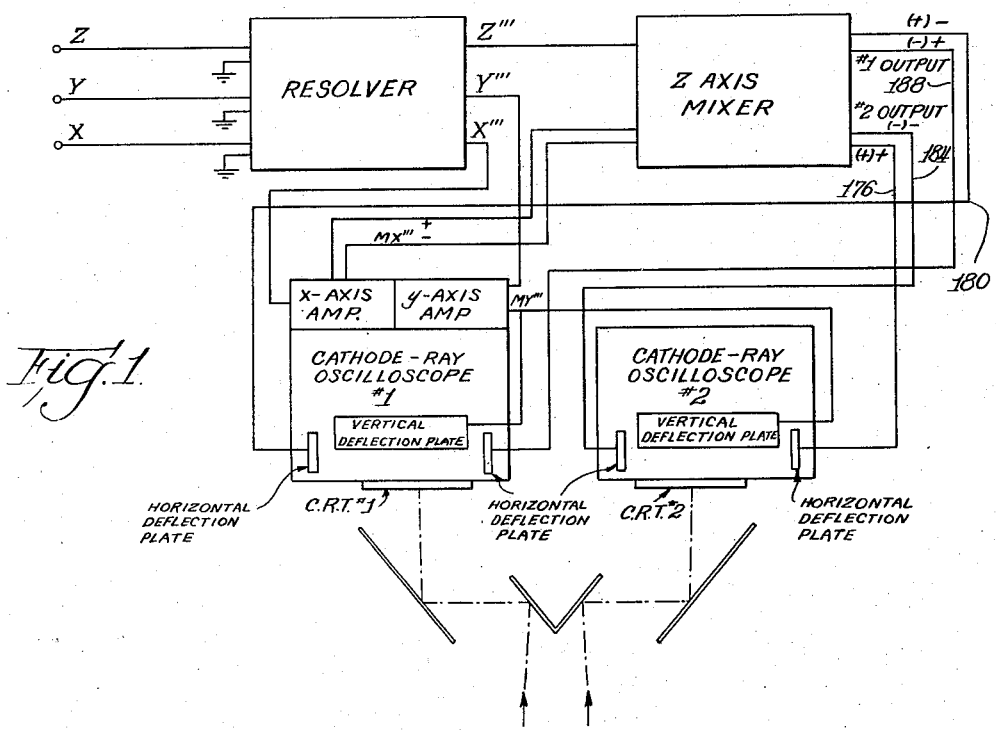
Figure 1 is a block diagram and a plan view of one form of my invention wherein a three-dimensional representation may be viewed directly.

A person gains the impression of depth through four visual cues, namely, accommodation, aspect, convergence and perspective. Accommodation may be defined as the changes in the eye which bring rays of light from various distances to focus upon the retina and is a relatively unimportant cue, since depth can be readily seen without this cue. Aspect relates to the mental visualization of an object when it is variously positioned. As a cube is rotated, it is evident that the cube has other faces and therefore depth. Aspect is not a completely visual cue but is also mental in nature. Convergence is due to the fact that the eyes are spaced apart. When an object on which the eyes are focused is held at arm's length and moved toward the eyes, with the eyes continually focused thereon, the angle subscribed between lines drawn from the object to the eyes increases. The change in the subscribed angle is mentally utilized to indicate that the object is moving closer. This angle is the factor which enables distance to be judged. Perspective is, of course, the appearance of objects in respect to their relative distance and position which makes all lines from the point of vision extend toward a vanishing point.

It is not necessary to have present all of the visual cues in order to see in three dimensions. Since the ability to see objects in a third dimension is not simply physiological but also psychological, seeing an object which is traced on a flat surface, in three dimensions by any combination of cues less than the total number, may require a certain amount of practice. The amount of practice will depend on the individual, and usually is very little, as evidenced by the fact that viewing a perspective drawing (the only cue being perspective) almost immediately gives an impression of depth. An isometric drawing utilizes the single cue of aspect.

By utilizing a single cue, such as aspect or convergence, the eyes can be made to see in three dimensions and by combining the cues of aspect and convergence, the eyes readily see in three dimensions. My invention contemplates using the cues of convergence, aspect and perspective in various combinations as well as using only a single one of the cues.

The method and apparatus described herein are applicable to many fields. In order to establish a basic understanding of the method and apparatus, an application to an analog computer will be discussed.

With the advent of electronic computers, many problems, heretofore too complicated for ready solution, have been solved rapidly. In the past, the solutions of such problems on an analog computer have been in the form of photographs taken from a cathode-ray tube connected to the analog computer. The photographic solution thus produced is often represented by many pages of photographs. These photographs are two-dimensional representations of the solutions, and, since the solutions are usually completely unfamiliar, weeks if not months of study of the photographs are required in order to utilize the solutions. The two dimensional representations do not give an intuitive understanding of the solutions.

A three-dimensional portrayal does provide the necessary qualities to permit a true appraisal of the solutions and thereby eliminates a great deal of work in utilizing the solutions. To permit an engineer to have an overall view of the solutions to a problem involving many parameters fosters real utility for the solutions, since the engineer has an abiding sense of understanding the solutions.

Bessel's functions might serve as an example. Although the solution to these functions can be expressed in an analytical form, the full meaning is not comprehended until a great deal of experience has been had with the solution. On the other hand, a study of a three-dimensional portrayal of Bessel's functions clearly demonstrates what the functions represent. Reference to the three-dimensional portrayals of Jahnke and Emde on pp. 192-3 in "Funktionen Tafein," published by B. G. Teubner, Leipzig and Berlin, 1933, will illustrate this.

Figure 1 shows a block diagram of one form of my invention. Leads X, Y and Z are connected to three voltages, which voltages may, for example, come from an analog computer or various other types of electrical equipment. The resolver operates upon the X, Y and Z voltages in such a manner as to perform an apparent spatial rotation of the viewed three-dimensional figure about any of the coordinate axes $x$, $y$ or $z$. The output voltages of the resolver are represented by $X'''$, $Y'''$ and $Z'''$. The $X'''$ voltage is connected to the $x$-axis amplifier of the #1 cathode-ray oscilloscope and is then connected to the $z$-axis mixer. The $Y'''$ output of the resolver is connected to the $y$-axis amplifier of the #1 cathode-ray oscilloscope and the output thereof is connected to the vertical deflection plates of the #1 and 2 cathode-ray oscilloscopes. The $Z'''$ output of the resolver is connected to the $z$-axis mixer.

The $x$-axis mixer produces the three-dimensional effect by combining the $X'''$ and $Z'''$ voltages. The two leads of the #1 output of the $z$-axis mixer are connected to the horizontal deflection plates of the #1 cathode-ray oscilloscope, while the two leads of the #2 output of the $z$-axis mixer are connected to the horizontal deflection plates of the #2 cathode-ray oscilloscope.

In the form of my invention shown in Figure 1, a mirror stereoptic system comprising four mirrors is used to view cathode-ray tubes #1 and 2 to produce a three-dimensional representation. The stereoptic system will be hereinafter more fully described.

As previously stated, the resolver serves to perform apparent spatial rotation of the viewed three-dimensional picture. The resolver is constructed from a consideration of Euler's equations of transformation. In the orthogonal Cartesian coordinate system, three dimensions are represented by three planes which are perpendicular to each other. Three axes $x$, $y$ and $z$ are drawn in the planes and are likewise perpendicular to each other. The transformation equations may be written as follows:

The first rotation is about the $y$-axis through an angle U.

$$X' = X \cos U - Z \sin U$$
$$Y' = Y \quad (1)$$
$$Z' = X \sin U + Z \cos U$$

The second transformation is rotation about the $x'$-axis through an angle V.

$$X'' = X'$$
$$Y'' = Y' \cos V + Z' \sin V \quad (2)$$
$$Z'' = -Y' \sin V + Z' \cos V$$

The third transformation is rotation about the $z''$-axis through an angle W.

$$X''' = X'' \cos W + Y'' \sin W$$
$$Y''' = -X'' \sin W + Y'' \cos W \quad (3)$$
$$Z''' = Z''$$

The block diagram of the resolver shown in Figure 2 is arranged to solve the equations of transformation for $X'''$, $Y'''$ and $Z'''$ by means of six amplifiers and six potentiometer sets, which potentiometer sets each contains a sine and cosine rheostat, as will be hereinafter explained.

Figure 3:
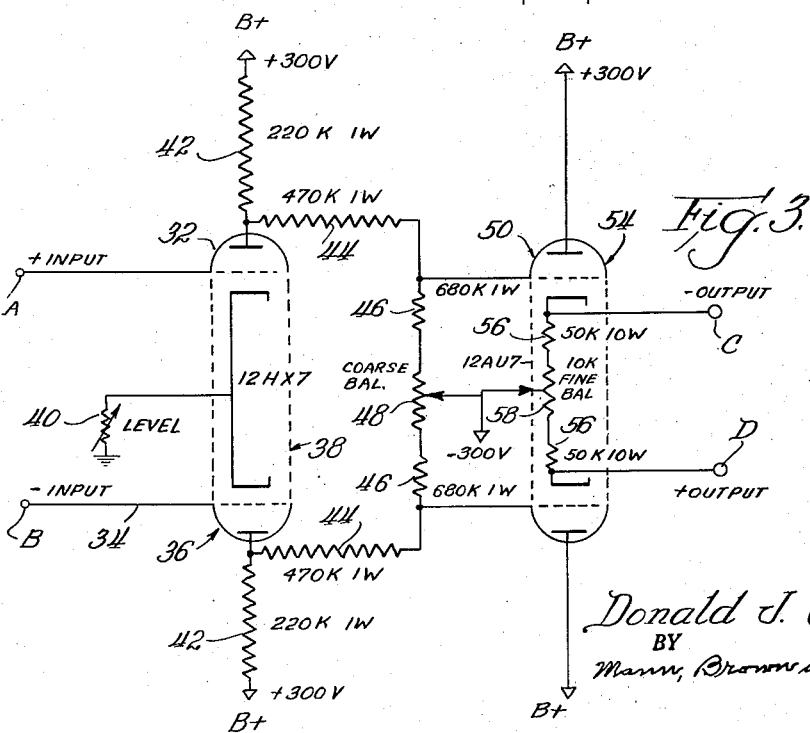
Figure 3 is a schematic diagram of one of the amplifiers of the resolver circuit.

Each of the amplifiers 1 through 6 of Figure 2 is identical and Figure 3 shows a schematic diagram of one of the amplifiers. The amplifiers are differential amplifiers, i. e., have two input terminals and two output terminals. Such differential amplifiers, although somewhat uncommon, operate exactly as an ordinary amplifier, but, instead of characterizing the gain of an amplifier by one constant, four constants are needed. In Figure 3, the positive input is indicated as A, the negative input as B, the negative output as C, and the positive output as D. The four gain factors of the amplifier may be defined as $$\frac{C}{A} = K_{ac}, \quad \frac{D}{A} = K_{ad}, \quad \frac{C}{B} = K_{bc}$$

and $$\frac{D}{B} = K_{bd}$$

If $K_{ac}$ is negative, i. e., a positive signal at A appears as an amplified negative signal at C, $K_{ad}$ would be positive, $K_{bc}$ would be positive, and $K_{bd}$ would be negative. The amplifier is constructed so that $$-N = K_{ac} = K_{bd} = -K_{bc} = -K_{ad}$$

Therefore, with voltages A and B applied to the input, the output voltage C may be expressed, $C = N(B-A)$. The output voltage D may be represented as $D = N(A-B)$. If B is equal to $-A$, the output voltage C is equal to 2NB. Thus it will be seen that the amplifier serves to add and subtract signals. The amplifier also serves to isolate the X, Y and Z voltage lines from the remainder of the circuit.

The particular amplifier shown in Figure 3 is by no means the only amplifier which may be used to add and subtract the signals and serve as an isolator, and it should be appreciated that various other amplifiers could be used. The positive input voltage lead is connected to the control grid of a triode section, generally designated 32, and the negative input lead 34 is connected to the control grid of a triode section 36. The triode sections 32 and 36 are sections of a dual triode tube designated 38. The cathodes of triode sections 32 and 36 are connected to ground through a biasing and coupling resistor 40 and the plates of the triode sections are connected to the positive terminal (B+) of the plate supply voltage through plate load resistors 42. The plates of the triode sections are each connected to one end of resistors 44. The other ends of resistors 44 are connected together through series-connected coupling resistors 46 and balancing potentiometer 48.

The grid of a triode section 50 is connected intermediate one resistor 44 and one biasing resistor 46 while the grid of another triode section is connected intermediate the other resistor 44 and biasing resistor 46. The triode sections are portions of a dual triode tube 54 and are cathode followers. The plates of these triode sections are connected directly to B+. The cathodes of these triode sections are connected together through a series network comprising biasing resistors 56 and fine balancing potentiometer 58. The output leads of the amplifier are connected directly to the cathodes of the triode sections.

The movable contacts of balancing potentiometers 48 and 58 are connected to a point of negative potential. D.-C. amplifiers have a tendency to drift. With the A and B input voltages equal to zero, and C and D output voltages should also be equal to zero. With the input leads connected to ground, i. e., zero voltage applied, the amplifier has drift in "level" and/or balance if any voltage appears between the two output leads and ground or between the two output leads. If a voltage does appear between the two output leads, the movable contacts of potentiometers 48 and 58 are moved until zero voltage appears across the output leads, and thus the amplifier is balanced in "level." A portion of balancing potentiometer 48 above its movable contact serves as a coupling resistance for the triode section 50 while the portion of balancing potentiometer 48 below the movable contact serves as coupling resistance for the other triode section of dual triode tube 54. The portion of balancing potentiometer 58 above its movable contact serves as a biasing resistor for the triode section 50, while the portion below its movable contact serves as a biasing resistor for the other triode section.

As indicated in Figure 2, the positive and negative output of each amplifier is connected to an attenuating resistor 60. The attenuating resistors 60 serve as voltage-dropping elements. The voltage-dropping resistors 60 are also connected to potentiometers. Each potentiometer set contains a sine-rheostat and a cosine-rheostat.

Referring to Figure 4, it will be seen that a positive input lead 62 is connected to one end of rheostat resistances 64 while a negative input lead 66 is connected to the other end of rheostat resistances 64. The centers of rheostat resistances 64 are connected to ground. A lead 68, representing the cosine output lead of the potentiometer, is connected to one of the movable contacts, while a lead 70, representing the sine output of the potentiometer is connected to the other of the contacts.

For an angle of zero degrees, the sine and cosine movable contacts are in the position shown. From Figure 4, it will be seen that the entire voltage developed between the positive input lead 62 and ground also appears between the cosine lead and ground, while no voltage appears between the sine lead and ground. This results since the cosine of zero degrees equals one and the sine of zero degrees is equal to zero. If the angle of rotation was 90°, the cosine movable contact would be moved down until it was in direct contact with ground, and the sine lead would be moved upwardly unitl it was in direct contact with the positive input lead 62, since the cosine of 90° is zero and the sine of 90° is one. If the angle of rotation was to be 180°, the cosine contact would be moved downwardly until it was in direct contact with the negative input lead 66, and the sine contact would be moved to a position of direct connection to ground, since the cosine of 180° is minus one and the sine of 180° is zero. If the angle was to be 270°, the cosine contact would be moved to a position of direct connection to ground and the sine contact would be moved into direct contact with the negative input lead 66, since the cosine of 270° is zero and the sine is minus one. Obviously, the contacts may be variously positioned to provide rotation through any angle from zero to 360°. The voltage appearing between the sine and cosine leads and ground will be equal to the voltage between the input and output leads and ground times the sine and cosine of the angle for which the movable contacts are adjusted.

It should be appreciated that the movable contacts of rheostats 64 are moved therealong at a nonlinear rate, since the cosine and sine functions are nonlinear. Various means may be provided for moving the contacts, such as eccentric cams and the like.

Referring to Figure 2, it will be seen that the various cosine and sine output leads of potentiometers 3, 4, 5 and 6 are connected to voltage-adding networks. Each voltage-adding network, generally designated 72, comprises a pair of resistors 74, one of which is connected to a sine output lead and the other is connected in a cosine output lead, and a potentiometer 76. The potentiometer 76 is connected to a point between resistors 74 and to ground. The $X'''$, $Y'''$ and $Z'''$ voltages are taken from the movable contacts of potentiometers 76.

The manner in which the resolver circuit shown in Figure 2 solves the transformation equations will become clear rfom the following analysis:

From the transformation equations $$X' = X \cos U - Z \sin U$$

Leads 78 and 80 in the upper central portion of Figure 2 represent the solution of the $X'$ equation. Tracing from the X input voltage lead through amplifier #1 and potentiometer #1, it will be seen that lead 78 has a potential equal to $X \cos U$. Tracing from the Z input lead through amplifier and potentiometers #2, it will be seen that lead 80 has a potential represented by $Z \sin U$. $Y'$ is equal to $Y$ and it will be seen that lead 82 has a potential equal to $Y$ and represents $Y'$. $Z'$ is equal to $X \sin U + Z \cos U$. The $Z'$ potential appears on leads 84 and 86. Tracing from the X input lead through amplifier #1 and potentiometer #1, it will be seen that lead 86 has a potential equal to $-X \sin U$ and tracing from the Z input lead through amplifier #2 and potentiometer #2, it will be seen that lead 84 has a potential equal to $Z \cos U$.

From the transformation equations, $X''$ is equal to $X'$, and, hence, the potential of $X''$ is that of leads 78 and 80. $Y''$ is equal to $Y' \cos V + Z' \sin V$. The $Y''$ potential appears on leads 88 and 90. Tracing from $Y'$ through amplifier 3 and potentiometer 3, it will be seen that lead 88 has a potential representative of $Y' \cos V$. Tracing from $Z'$ through amplifier 4 and potentiometer 4, it will be seen that line 90 has a potential of $Z' \sin V$. From the transformation equations $$Z'' = -Y' \sin V + Z' \cos V$$

The potential $Z''$ is represented by leads 92 and 94. Tracing from $Y'$ through amplifier 3 and potentiometer 3, it will be seen that lead 94 has a potential corresponding to $-Y' \sin V$, and tracing from $Z'$ through amplifier 4 and potentiometer 4, it will be seen that lead 92 has a potential of $Z' \cos V$.

From the transformation equations $X''''$ is equal to $X''' \cos W + Y'' \sin W$ and $Y''''$ is equal to $-X'' \sin W + Y'' \cos W$, and $Z''' = Z''$. The $X'''$, $Y'''$ and $Z'''$ leads are shown on the right-hand side of Figure 2. Tracing from $X''$, represented by leads 78 and 80, through amplifier 5 and potentiometer #5, it will be seen that the upper potentiometer 76 has developed thereacross a voltage proportional to $X'''\cos W$, and tracing from $Y'''$ though amplifier 6 and potentiometer #6, it will be seen that the upper potentiometer 76 has developed thereacross a voltage proportional to $Y'''\sin W$. Tracing from $X'''$ through amplifier 5 and potentiometer 5, it will be seen that potentiometer 76 associated with $Y'''$ has developed thereacross a voltage proportional to $X'''\sin W$, and tracing from $Y'''$ through amplifier 6 and potentiometer 6 to the potentiometer 76 associated with the $Y'''$ lead, it will be seen that a voltage is developed thereacross proportional to $Y'''\cos W$. Since $Z'''$ is equal to $Z''$, the potentiometer 76 associated with the $Z'''$ lead will have a voltage developed thereacross proportional to $Z''$.

In tracing through the solutions to the transformation equations in Figure 2, some difficulty may be encountered in understanding the sign of the various terms. The arrowheads affixed to the output leads of the sine and cosine potentiometers indicate the direction in which the output leads shown in Figure 4 are initially moved, i. e., starting at zero and varying the angle. Further, it must be remembered that the bottom input lead to each amplifier is considered to be the negative input lead.

Referring to Figure 4 and the #1 potentiometer of Figure 2, it will be seen that lead 78 is connected to the positive input lead of the #5 amplifier, and, hence, lead 78 is in the same position as cosine lead 68 of Figure 4, and to increase the angle, the lead 78 would be moved downwardly. The lead 86 of Figure 2 is connected to potentiometer #1 at the same position as is the sine lead 70 of Figure 4, and since the lead 86 is connected to the negative input of amplifier #4, the sine lead 86 must be moved downwardly in order to bring about an increase in the angle U. These considerations should adequately demonstrate that the signs of the various terms of the transformation equations are properly accounted for in the potentiometers and amplifiers of Figure 2.

However, one other point must be discussed in order to demonstrate that the signs of the terms in the transformation equations are properly accounted for in the remaining amplifiers. $X'''$ has only positive terms, and, hence, it will be noted that the cosine W lead of potentiometer 5 and since W lead of potentiometer 6 are moved in the proper direction to provide positive voltages. However, $Y'''$ has a negative and a positive term, and, hence, it will be noted that the cosine W lead of potentiometer 6 is moved so as to provide a positive term while the sine W lead of potentiometer 5 is moved in such a direction as to provide the negative term. Likewise, it will be noted that $Z'''$ has a negative term and that the sine V lead of potentiometer 3 is moved in such a direction so as to provide a negative sign. Of course, it must be understood that whenever an angle of rotation is greater than 90°, the absolute sign of certain of the terms changes and the sine and cosine are arranged to accomplish this.

The potentiometers 76 are "ganged" potentiometers and serve to uniformly decrease or increase the potential of the $X'''$, $Y'''$ and $Z'''$ voltages. Increasing or decreasing the amplitude of these voltages will increase or decrease, respectively, the size of the three-dimensional representation.

From the preceding description, it should be appreciated that the output voltages of the resolver have been varied in magnitude in such a manner as to effect spatial revolution of the three-dimensional representation. Referring to Figure 1, it will be seen that the $Z'''$ voltage is fed directly into the z-axis mixer, while the $X'''$ voltage is amplified by the x-axis amplifier and then passed to the z-axis mixer. The z-axis mixer combines the $X'''$ and $Z'''$ voltages and varies the magnitude of the $Z'''$ voltage in such a manner as to provide a three-dimensional effect. In order to more fully appreciate the operation of the z-axis mixer, an understanding of the principles of convergence must be had. An explanation of the simple mirror stereoptic system shown in Figure 1 will serve to demonstrate the necessary principles of convergence.

Figure 5 is a plan view of the mirror stereoptic system shown in Figure 1. Line 98 represents the face of cathode-ray tube C. R. T.) #1 of Figure 1, and line 100 represents the face of cathode-ray tube (C. R. T.) #2 of Figure 1. The eyes of the viewer are represented at 102. Two mirrors 104 and 106 combine the right-hand side of the stereoptic system, and similar mirrors 108 and 110 comprise the left-hand side of the stereoptic system. With a spot of light at point B on line 98, light will pass from the spot B to mirror 108 along line 112, be reflected by mirror 108 and passed to mirror 110, along line 114, and, hence, to the left eye of the observer along line 116. With a similar spot at point C, light will pass from spot C to mirror 104 along line 118, to mirror 106 along line 120, and to the right eye of the observer along line 122.

Extending lines 116 and 122 through mirrors 110 and 106, respectively, they intersect at a point A. The viewer will see a single spot of light at A.

If the spot B on line 98 is moved to point B', and the spot C on line 100 is moved to point C', the light from point B' will then pass to the left eye of the observer along lines 124, 126 and 128, while the light from spot C' will pass to the right eye of the observer along lines 130, 132 and 134. By extending lines 128 and 134 through mirrors 110 and 106, respectively, they intersect at a point A'. The observer will then see a single spot of light which will appear to be at point A'. By the same token, if points C and B were moved toward each other an equal amount, the image of the spot would appear to move closer to the observer. Thus, it will be seen that by merely moving spots B and C in opposite directions, the depth at which the spot appears to the observer may be varied.

Figure 6 is a diagram of a portion of the stereoptic system. One eye of the observer is represented at 136 and the left-hand inner mirror 110 of Figure 5 is shown disposed at an angle of 45° relative to a vertical plane indicated by line 138 taken halfway between the eyes of the observer. The position of the spot is again represented by points A and A'. The perpendicular distance between line 138 and the point of intersection of a line drawn between eye 136 and point A with the mirror 110 is designated D, while the perpendicular distance between line 138 and the point of intersection of a line drawn between eye 136 and point A' with mirror 110 is designated $D_0$. The distance at which point A appears behind the front edge of mirror 110 is designated by C, while the distance to the point A' is designated by $C_0$. The distance from the front edge of mirror 110 to the plane of the eyes is represented by $B_0$, while one-half the interocular distance, i. e., one-half the distance between the eyes, is represented by M. One-half the interocular distance of the ordinary person is approximately 1.25".

From similar triangles, the following equation can be written:

$$\frac{D}{C-D}=\frac{M}{B_0+C}$$

Solving this equation for D gives the following result:

$$D=\frac{MC}{B_0+M+C}$$

By substituting $M=1.25''$ the equation becomes:

$$D=\frac{1.25C}{1.25+B_0+C}$$

Figure 7 is a representation of the left-hand portion of Figure 5 and corresponding numbers are used to designate similar parts. With the spot B at the right-hand edge of the left-hand cathode-ray tube represented by line 98, the spot A appears to be relatively close to the observer. When the spot B is moved to point B', at the left-hand edge of the left-hand cathode-ray tube represented by line 98, the point A' will have moved an infinite distance away from the observer. Hence, by moving the spot on line 98 between point B and B', the spot A can be moved from infinity to a position very close to the observer.

Since the stereoptic system is symmetrical, the right-hand portion may be analyzed similar to the manner of analysis of Figure 7. By such an analysis for the right-hand portion of the stereoptic system, it will be found that the point A may be moved from very close to the observer to an infinite distance by moving the spot of light on the right-hand cathode-ray tube represented by line 100 in Figure 5 from the left-hand edge to the right-hand edge, respectively. As previously stated, the depth of point A is controlled by moving spots B and C in opposite directions. It should also be appreciated that if the spots B and C are moved in the same direction, the spot A will appear to move in this direction.

Figure 8:
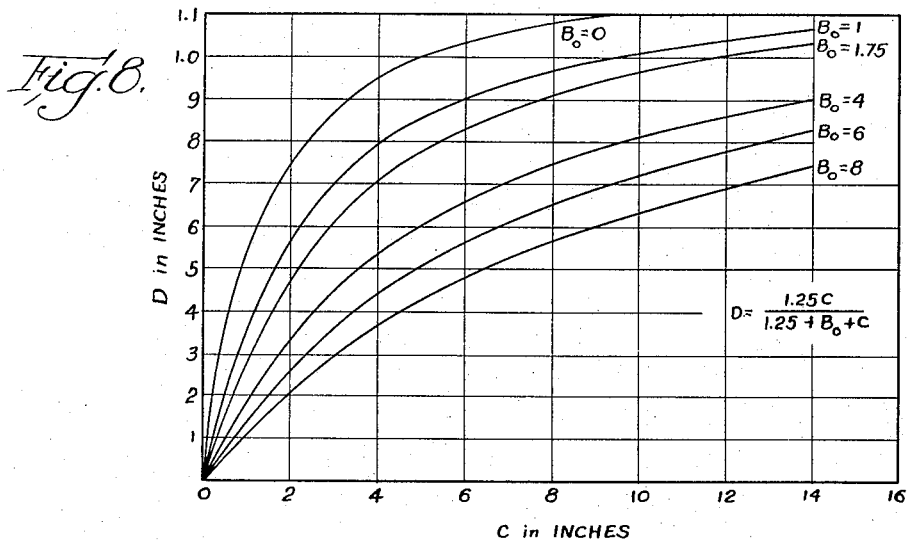
Figure 8 is a graph of the solution of the equation of convergence.

Figure 8 shows a graphical solution of the equation:

$$D = \frac{1.25C}{1.25 + B_0 + C}$$

From Figure 6, it will be noted that the maximum value of D is 1.25", i. e., one-half the interocular distance, since when D equals 1.25, the depth of the point behind mirror 110 represented by C is equal to infinity. Hence, the curves shown in Figure 8 approach the ordinate 1.25.

The curves of Figure 8 show that as the point of convergence moves out farther and farther, the points on the faces of the cathode-ray tubes approach a fixed limit. The curves are obviously nonlinear.

From Figures 5, 6 and 7, it should be noted that the distance D shown in Figure 6 is proportional to the distance over which the spots of light are moved on the face of the cathode-ray tubes. Thus, if the $Z'''$ voltage is applied to the horizontal deflecting plates of the cathode-ray tubes so as to move the spot produced by the beam of electrons, a distance proportional to the values of D represented by any of the curves in Figure 8, and the spot on each cathode-ray tube is moved in the opposite direction to the spot on the other cathode-ray tube, viewing the cathode-ray tubes through the stereoptic system will produce the impression of depth. Also, in order to move the spots of light on the cathode-ray tubes to correspond with the $X'''$ voltage, this voltage must also be applied to the horizontal deflection plates of the cathode-ray tube. The z-axis amplifier serves the dual function of producing a $Z'''$ voltage proportional to variations in D, and of combining this voltage with the $X'''$ voltage for application to the horizontal deflection plates of the cathode-ray tubes.

From Figure 8, it will be noted that the curves resemble a graph of the output voltage versus the input voltage of a saturating amplifier. By matching the output voltage versus the input voltage of a saturating amplifier to one of the curves of Figure 8, the output voltage of the saturating amplifier will be proportional to the value of D.

Figure 9:
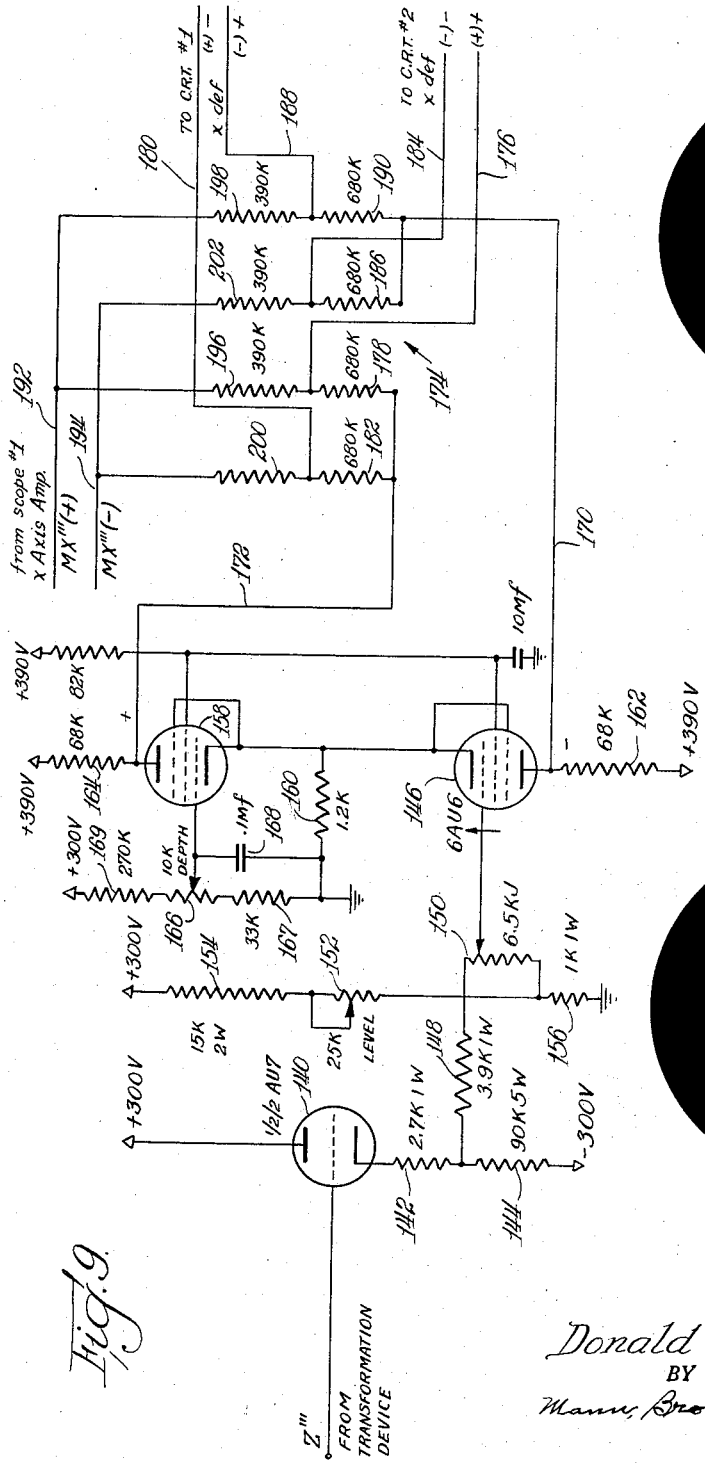
Figure 9 is a schematic diagram of the z-axis mixer.

Figure 9 shows a schematic diagram of the z-axis mixer and includes a D.-C. saturating amplifier. The $Z'''$ lead from the resolver is connected to the grid of a triode tube designated 140. The plate of triode 140 is connected to the plate supply voltage, while the cathode is connected to a negative supply potential through a cathode biasing resistor 142 and a voltage-dropping resistor 144. The output of triode tube 140 is coupled to the control grid of a pentode 146 through a resistor 148 and through a portion of a coupling potentiometer 150. It will be noted that triode 140 is connected as a cathode follower and serves to isolate the resolver circuit from the circuit to the right-hand of triode 140.

The coupling potentiometer 150 is connected in a biasing network consisting of a potentiometer 152 and voltage-dropping resistors 154 and 156. One end of the biasing network is connected to a positive voltage supply and the other end is grounded. The potentiometer 152 serves to make the output voltage level of pentode 146 and 158 independent of any variation in potentiometer 150 in order to make the apparent depth independent of the eye span. Resistor 156 provides a D.-C. bias for pentode 146.

The cathode of pentode 146 is connected directly to the cathode of an identical pentode 158. The cathodes of pentodes 146 and 158 are connected to ground through a resistor 160 and the plates of pentodes 146 and 158 and connected to a positive plate supply voltage through plate load resistors 162 and 164, respectively. The control grid of pentode 158 is connected to the movable contact of a potentiometer 166. One end of the potentiometer is grounded through a biasing resistor 167 while the other end is connected to a positive voltage supply through a voltage-dropping resistor 169. The screen grid and suppressor grids of pentodes 146 and 158 are connected in the conventional manner. A bypass condenser 168 is connected between the grid of pentode 158 and ground. Thus, by varying the position of the movable contact of potentiometer 166, the D.-C. bias on tube 158 may be varied. From the foregoing it will be apparent that pentodes 146 and 158 are cathode-coupled, and therefore act as a differential amplifier. Output leads 170 and 172 are connected to the plate of tubes 146 and 158, respectively.

Since tubes 146 and 158 are connected as a differential amplifier, they will have a positive and a negative output. In Figure 9, output lead 172 is represented as the positive output lead, while output lead 170 is represented as the negative output lead. It should be appreciated that the output signals have a D.-C. level, and thus the input signal will appear in the output as a variation about the D.-C. level. This, of course, is necessary, since the deflection plates of a cathode-ray tube require a certain D.-C. level of voltage for their operation.

The output leads 170 and 172 are connected to a voltage-adding network, generally designated 174. As previously explained, the $Z'''$ voltage must be combined with the $X'''$ voltage for application to the horizontal deflection plates of the cathode-ray tubes. The positive potential $Z'''$ voltage on output lead 172 is connected to a lead 176 through a resistor 178 and to a lead 180 through a resistor 182. The negative $Z'''$ voltage on output lead 170 is connected to a lead 184 through a resistor 186 and to lead 188 through a resistor 190. Leads 176 and 184 are connected to the horizontal deflection plates of cathode-ray oscilloscope #2 shown in Figure 1, and leads 180 and 188 are connected to the horizontal deflection plates of cathode-ray oscilloscope #1 shown in Figure 1.

Referring to Figure 1, it will be seen that leads 180 and 188 are connected to the left-hand and right-hand horizontal deflection plates, respectively, of the cathode-ray oscilloscope #1, and leads 176 and 184 are connected to the right-hand and left-hand horizontal deflection plates, respectively, of cathode-ray oscilloscope #2. Thus, it will be seen that the positive $Z'''$ voltage appears on the left-hand horizontal deflection plates of cathode-ray oscilloscope #1 and on the right-hand horizontal deflection plate of cathode-ray oscilloscope #2. The negative $Z'''$ voltage appears on the left-hand and right-hand horizontal deflection plates of oscilloscopes #1 and #2, respectively. Hence, any change in the $Z'''$ voltage will deflect the electron beams of oscilloscopes #1 and #2 in the opposite direction.

Referring again to Figure 9, it will be seen that the $MX'''$ voltage leads are connected to leads 192 and 194. The amplitude of the $X'''$ voltages has now been increased since the $X'''$ output of the resolver was passed through the x-axis amplifier of cathode-ray oscilloscope #1, and this increase in amplitude is represented by constant M. The negative $X'''$ voltage is carried by lead 194, while the positive $X'''$ is carried on lead 192. The positive $X'''$ voltage is connected to lead 176 through a resistor 196 and to lead 188 through a resistor 198. The negative $X'''$ voltage is connected to lead 180 through a resistor 200 and to lead 184 through a resistor 202. Thus, it will be seen that leads 180 and 188 have impressed thereon the negative $X'''$ voltage and the positive $X'''$ voltage, respectively, while leads 176 and 184 have impressed thereon the positive $X'''$ voltage and negative $X'''$ voltage, respectively.

Referring to Figures 1 and 9, it will be seen that the left-hand horizontal deflection plates of both cathode-ray oscilloscopes have the negative $X'''$ voltage impressed thereon, while the right-hand deflection plates of both oscilloscopes have the positive $X'''$ voltage impressed thereon. Hence, variations in the $X'''$ voltages will deflect the beams of electrons of the oscilloscopes in the same direction.

From the foregoing description of the z-axis mixer, it will be appreciated that the voltages applied to the horizontal deflection plates from the z-axis mixer are of the correct sign to move the spots produced on the face of the cathode-ray tubes in the appropriate directions to satisfy the equations developed in the consideration of convergence.

Figure 10:
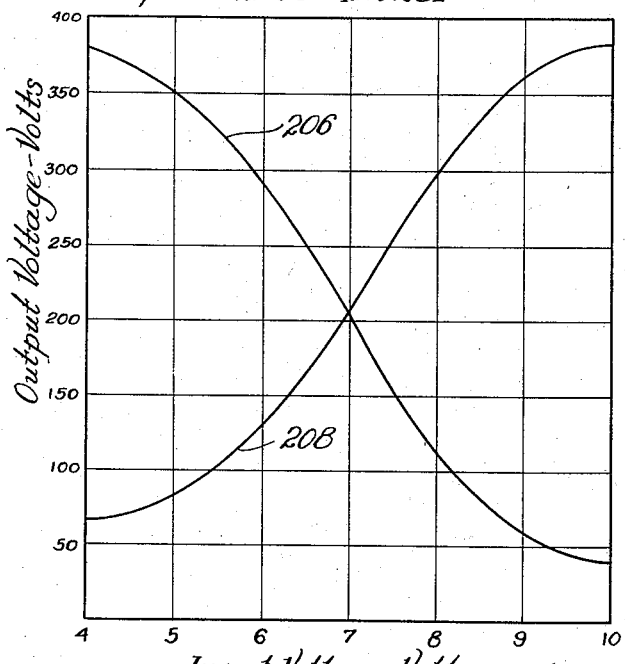
Figure 10 is a graph of the output voltages versus the input voltage of the differential amplifier shown in Figure 9.

Figure 10 is a graph of the output voltages of the pentodes 146 and 158 versus the input voltage. Curve 206 represents the output voltage on output lead 170 and curve 208 represents the output voltage on output lead 172. From Figure 10, it will be seen that the output voltages of the pentodes 146 and 158 are similar in shape to the curves of Figure 8 in that the output voltages approach a fixed level as the input voltage is increased. This is accomplished by operating the amplifier as a saturating amplifier. Matching the output of the z-axis mixer amplifier to the curves for convergence represents an important concept in producing three-dimensional representations. Hence, it will be seen that the $Z'''$ output voltages of the z-axis mixer are of the proper magnitude to satisfy the requirements of convergence.

As was previously stated, the size of the three-dimensional figure is varied by changing the effective resistance value of the ganged potentiometer 76 shown in Figure 2. The size of the picture is increased by increasing the amount of effective resistance between the movable contacts of potentiometer 76 and ground and decreased by decreasing the effective resistance between the movable contacts and ground. The potentiometer 166 of the z-axis mixer serves to move the three-dimensional figure closer to or farther away from the observer. This is termed depth control. By varying the D.-C. grid bias on pentode 158, i. e., moving the movable contact along potentiometer 166, the entire three-dimensional figure appears to move either toward or away from the observer. If the bias on pentode 158 is made more positive, the output voltage on output lead 172 will be reduced and the output voltage on output lead 170 will be made more positive, and therefore the spot on cathode-ray tube #1 will move to the right and the spot on cathode-ray tube #2 will move to the left, and this, of course, causes the image to move closer to the observer. Similarly, if the D.-C. bias on pentode 158 is made more negative, the three-dimensional figure will appear to move away from the observer. Usually some particular value of depth which makes the three-dimensional visualization easiest may be readily found.

The coupling potentiometer 150 connected to the control grid of pentode 146 serves to change the effective eye span. It will be recalled that the formulas of convergence were developed for an eye span of 1.25". Since this is an approximation, a person having a wider eye span may experience some difficulty in viewing the three-dimensional figure, and this difficulty can be removed by adjusting the coupling potentiometer 150.

As a review of the preceding discussion, it should now be appreciated that the resolver enables an operator to rotate the three-dimentional figure viewed on the cathode-ray tube by the stereoptic system through an angle of 360° about all of the coordinate axes, and that the z-axis mixer operates on the $X''''$ and $Y''''$ voltages so as to provide voltages on the horizontal deflection plates that produce the three-dimensional effect. The three-dimensional figure may be rotated about the $x$, $y$, $z$ axes by moving the sine and cosine contacts of potentiometers #1 and 2 of Figure 1 to the desired angle, by moving the cosine and sine contacts of potentiometers #3 and 4 to the desired angle, and by moving the cosine and sine contacts of potentiometers 5 and 6 to the desired angle, respectively. As a practical matter, ease of operation is effected by ganging the movable contacts of potentiometers 1 and 2, the movable contacts of potentiometers 3 and 4, and the movable contacts of potentiometers 5 and 6. The size of the three-dimensional figure may be changed by adjusting the ganged potentiometer 76 connected in the $X'''$, $Y'''$ and $Z'''$ outputs of the resolver, and the entire three-dimensional figure may be moved toward or away from the observer by varying the effective value of potentiometer 166 connected to the grid of pentode 158. Thus, the observer has complete control over the three-dimensional picture and has at hand all of the visual cues necessary to give an intuitive understanding of the line, surface or figure viewed in three dimensions.

Figure 11:
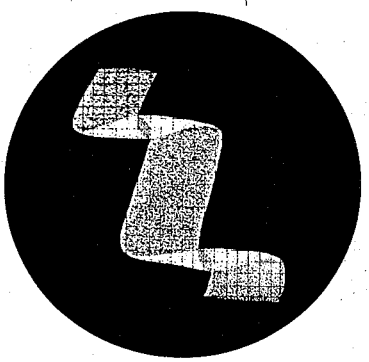
Figure 11 is a reproduction of a three-dimensional representation produced by the apparatus of my invention when the angles U, V and W were equal to 45°.

Figure 11 shows an actual three-dimensional figure viewed on the apparatus heretofore described. The input X, Y and Z voltages to produce the figure shown in Figure 11 were as follows: No voltage was connected to the X input lead but the saw-tooth wave generator of cathode-ray oscilloscope #1, of course, produced a saw-tooth voltage for the horizontal deflection plates of both oscilloscopes. The Y input voltage was a sinusoidal wave form of a frequency approximately twice that of the saw-tooth wave form. The Z input voltage was a high frequency sinusoidal wave having a frequency of many times that of the Y input voltage.

Figure 11 shows the three-dimensional representation of these X, Y and Z voltages rotated through an angle of 45° about each of the three coordinate axes. In other words, $U=45°$, $V=45°$ and $W=45°$.

Figure 12:
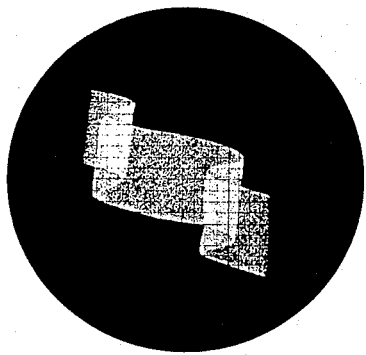
Figure 12 is another view of the three-dimensional representation shown in Figure 11 but with U equal to 105°, V equal to zero degrees and W equal to 45°.

Figure 12 is a representation of the same three-dimensional figure shown in Figure 11, but with $U=105°$, $V=0°$, and $W=45°$. From Figures 11 and 12, it should be apparent that an observer can sense the true meaning of the figure. Since the figure may be rotated through an angle of 360° about all of the coordinate axes, the observer can look at all sides of the three-dimensional figure from any particular point in space from which he wishes to view the figure, and thereby obtain a complete understanding of the configuration of the figure.

In Figures 11 and 12 the three-dimensional representation is shown as a surface for convenience in depiction, but as actually viewed the representation shows a sinusoidal line in the same plane as the surface and this sinusoidal line is the Y input voltage.

In order to assist in interpreting a three-dimensional figure, it is often desirable to show the $x$, $y$ and $z$-axes. Also, if the three-dimensional figure represents the solution to a problem, a means is needed for determining the coordinates of various points on the line, surface or the like.

Figure 13 shows a combined spot position indicator and axis tracer. The apparatus of Figure 13 produces $x$, $y$ and $z$-axes in the viewed picture as well as producing a single spot in the picture which may be moved around at will.

The combined spot position indicator and axis tracer is connected to the X, Y and Z signal leads ahead of the resolver. The X, Y and Z signal leads in Figure 13 are indicated at 210, 212 and 214, respectively. Each of the X, Y and Z leads is connected to an elongated portion 216 of a segmented circular strip 218. Rotary contacts 220, 222 and 224 are mounted so as to electrically contact the segmented strip. The rotary contacts 220, 222 and 224 are connected to X, Y and Z leads 226, 228 and 230, respectively, which leads are then connected to the resolver circuit.

The rotating contacts are rotated at the same uniform rate. Thus, whenever the rotating contacts are in contact with elongated portions 216, the X, Y and Z input leads are connected directly to the X, Y and Z output leads, and, hence, the voltages pass directly through the combined spot position and axis tracer. Each of the segmented strips has a short portion 232 connected to one input terminal 234 of an audio oscillator (not shown in Figure 13) through a lead 236, a pair of short portions 238 connected to the other input terminal 240 of an audio oscillator through a lead 242. The lead 242 is also connected to a ground common to the X, Y and Z voltages through a lead 244. Thus, when rotating contact 220 touches short portion 232, the X input voltage will no longer bypass to lead 226, and the output voltage of the audio oscillator will appear across the X output lead 226 and ground; when rotating contact 222 touches short portion 232, the Y input voltage will no longer be passed to output lead 228 and the audio oscillator voltage will appear between the Y output lead and ground; and when rotating contact 224 touches short portion 232, the Z input voltage will no longer be connected to output lead 230, and the audio oscillator voltage will appear between the Z output lead 230 and ground. From Figure 13, it will be seen that the audio oscillator voltage will first appear between the X output lead 226 and ground, then the Y output lead 228 and ground, and finally the Z output lead 230 and ground.

The short portions 232 as well as the other short portions of each segmented strip are very short in length, and, hence, the time during which the rotating contacts are in contact with the short portions is extremely small. Hence, the output of the audio oscillator appears between the output leads and ground for only an instant. The frequency of the audio oscillator should be fairly high and, therefore, from one-half to one-fourth of a single cycle of the audio output voltage will be impressed on one of the output leads. After passing through the resolver and, in the case of the X and Z voltages, through the z-axis mixer, the voltage from the audio oscillator will trace a substantially straight line across the faces of the cathode-ray tubes, which straight line is properly oriented to represent the x, y or z-axes. From Figure 13 it will be seen that the rotating contacts first connect the X output lead to the audio oscillator, then the Y output lead, and finally the Z output lead, so that the x, y and z-axes are traced in this order.

Lead 242 is also connected to a center tap on batteries 246 through a lead 248. Potentiometers 250, 252 and 254 are connected across the batteries 246 and the movable contacts of these potentiometers are connected to leads 256, 258 and 260, respectively. Lead 256 is connected to a short portion 262, lead 258 is connected to a short portion 264, and lead 260 is connected to a short portion 266, of the segmented strips associated with the X, Y and Z voltages, respectively.

Batteries 246 will develop a voltage drop across resistors 250, 252 and 254. The movable contacts of these potentiometers may be positioned to tap off a certain proportion of the voltage developed across these potentiometers, and the voltage thus tapped off will appear between short portions 262, 264 and 266 and ground. Thus, when movable contact 220 touches short portion 262, a D. C. potential will exist for an instant between the X output lead 226 and ground; when rotating contact 222 touches short portion 264, a D. C. potential will exist for an instant between the Y output lead 228 and ground; and when rotating contact 224 touches short portion 266, a D. C. potential will exist for an instant between the Z output lead 230 and ground.

The D. C. potentials thus produced on the X, Y and Z output leads will produce a spot on the face of the cathode-ray tubes. The position of this spot may be varied by moving the movable contacts of potentiometers 250, 252 and 254. The spot may be moved along the x-axis by varying the amount of voltage tapped off of potentiometer 250, along the y-axis by varying the amount of voltage tapped off of potentiometer 252, and along the z-axis by varying the amount of voltage tapped off of potentiometer 254. Thus, it will be seen that the position-indicating spot may be moved throughout the confines of the three-dimensional picture.

Since the coordinates of the indicating spot are proportional to the amount of voltage tapped off of the potentiometers 250, 252 and 254, the numerical value of the coordinates may be ascertained by reading the voltages tapped off of potentiometers 250, 252 and 254. A "3-position switch," designated 268, has three terminals connected to the movable contacts of rheostats 250, 252 and 254 and a switch leg 270 connected to terminal 272 and 274 of a double-pole, double-throw switch 276. Two other terminals 278 and 280 of switch 276 are connected to ground. The switch legs of switch 276 are connected to a voltmeter 282. The double-pole, double-throw switch 276 enables the polarity of the voltages tapped off of potentiometers 250, 252 and 254 to be correctly applied to the D. C. voltmeter 282. Since the ground connection to batteries 246 is at the center, it will be appreciated that the voltages tapped off of the parallel resistors may be positive or negative relative to ground.

When the spot is moved to a particular location in the three-dimensional figure, voltmeter 282 is read first with the switch arm 270 in the lower position to give the x value, then with the switch leg 270 in the intermediate position to give the y value, and, finally, with the switch leg 270 in the upper position to give the z value.

It will be noted in Figure 13 that the rotary contacts 220, 222 and 224 will simultaneously touch portions 262, 264 and 266, respectively, and thereby simultaneously connect the voltage tapped off of potentiometers 250, 252 and 254 to the X, Y and Z output leads. These D. C. voltages are simultaneously applied to produce the single mobile spot but when the oscillator output is connected to one of the output leads, the other output leads must be grounded so that a single substantially straight line can be traced on the cathode-ray tubes, otherwise the axis would not be traced as a straight line but would be curved in conformity with the variations in the voltages on the other output leads.

Hence, when rotary contact 220 touches portion 232, rotary contacts 222 and 224 are touching portions 238 to ground output leads 228 and 230, when rotary contact 222 touches portion 232, rotary contacts 220 and 224 are touching portions 238 to ground output leads 226 and 230 and, when rotary contact 224 touches portion 232, rotary contacts 220 and 222 touch portions 238 to ground output leads 226 and 228. Thus it will be seen that the x, y and z-axes are traced with the oscillator voltage connected to one of the X, Y or Z leads while the others are grounded.

In the preceding discussion, it has been assumed that rotation about three axes was desirable. In ordinary practice, it is sufficient to provide for rotation of the three-dimensional figure about only the y and x'-axes, since rotation about the z"-axis generally adds very little information toward appreciating what the three-dimensional figure represents. In order to eliminate rotation about the z"-axis, it is only necessary to remove amplifiers #5 and 6 and potentiometers #5 and 6 from the circuit shown in Figure 3, and to connect leads 78 and 80 to the voltage-adding network associated with the X'" output lead, and to connect the leads 88 and 90 to the voltage-adding network associated with the Y''' output lead. The voltage-adding network associated with the Z''' output lead remains unchanged. It must be appreciated that the signs of the voltage components must be properly preserved.

For various reasons it may also be desirable to eliminate rotation about the x-axis of the three-dimensional figure, and this is readily brought about by removing amplifiers 3 and 4 and sine and cosine potentiometers 3 and 4, from the circuit of Figure 3 and connecting leads 78 and 80 to the voltage-adding network associated with the X''' output, connecting leads 84 and 86 to the voltage-adding networks associated with the Z''' output, and connecting lead 82 to the voltage-adding network associated with the Y''' output.

In some applications it will be found that there is no necessity of rotating the three-dimensional figure, since sufficient information may be obtained from viewing the three-dimensional figure from but one position. Hence, it should be appreciated that the resolver circuit may be eliminated and the X, Y and Z input leads connected directly to the X''', Y''' and Z''' output leads of the resolver. The remainder of the circuit will operate in the same manner and produce a non-rotatable three-dimensional figure.

The apparatus described heretofore permits an observer to view the three-dimensional picture as it is being produced. It is possible, of course, to take a photograph of the trace on the right-hand cathode-ray tube and another photograph of the trace on the left-hand cathode-ray tube and view these photographs on various types of stereoscopes, or various types of stereoptic cameras could be used to photograph the traces. However, when the three-dimensional picture is to be imprinted on film, the circuit shown in Figure 1 may be materially simplified by eliminating one of the cathode-ray tubes.

Figure 14 is a block diagram showing a modification of my device which enables a three-dimensional picture to be recorded by using a single cathode-ray tube and a camera. The output leads of the x-axis amplifier are designated by the same numbers as in Figure 1 and are connected to a double-pole, double-throw switch designated 284. The switch legs of switch 284 are connected to the horizontal deflection plates of the cathode-ray oscilloscope. Thus, when the switch legs make contact with leads 180 and 188, the trace on the cathode-ray tube is the same as the trace that would have been produced on oscilloscope #1 of Figure 1, and when the switch legs make contact with leads 176 and 184, the trace on the cathode-ray tube of Figure 14 is similar to that which would have been produced on oscilloscope #2 of Figure 1.

In Figure 14 a camera 286 is disposed in front of the face of the cathode-ray tube. In operating the apparatus shown in Figure 14, the switch legs of switch 284 are moved into contact with leads 180 and 188 and a first picture is taken by camera 286. The switch legs are then moved into contact with leads 176 and 184, another unexposed portion of film is moved into recording position in camera 286, and a second picture is taken of the trace produced on the cathode-ray tube. The traces produced on the cathode-ray tube may then be viewed in three-dimensions by taking the photograph produced from the first exposed film and using it as a left-hand picture in a stereoscope and taking the photograph produced from the second exposed film and using it as a right-hand picture in a slide stereoscope. Various other means of producing photographic three-dimensional pictures will, of course, be apparent to those skilled in the art.

In the circuits heretofore discussed, it will be noted that the X''' and Y''' voltages were connected to the x and y-axis amplifiers of an oscilloscope. These amplifiers provide a simple means for amplifying the X''' and Y''' voltages, but it must be appreciated that other amplifiers may be used, or no amplifiers need be used if the level and magnitude of the X''' and Y''' voltages are sufficient for direct application of these voltages to the deflection plates of the cathode-ray tube or tubes.

A representation in three dimensions on cathode-ray tubes may often be improved by shading the three-dimensional figure. In other words, the portions of the figure closest to the operator are made brighter than those more remote portions. Three-dimensional shading may be accomplished by connecting the negative Z''' voltage to the control grid of a cathode-ray tube. The control grid of a cathode-ray tube is ordinarily used to dim or brighten the entire trace produced on the face of the tube. When the negative Z''' voltage is connected to the control grid of the cathode-ray tube or tubes, an increase in the Z''' voltage will cause the control grid to go more negative, and hence reduce the beam current, and thereby reduce the brilliancy of the trace being produced on the face of the tube. The net result, as stated above, is that the rear portions of the three-dimensional line or surface are darkened while the portions less remote remain unaltered. The amount which a portion is dimmed is proportioned to its distance from the observer so three-dimensional visualization is enhanced.

It should be appreciated that the apparatus heretofore discussed contemplates using the cues of convergence and aspect to present a three-dimensional representation of voltages. The cue of perspective could also be included, and thereby further aid in the visualization of the third dimension, but it is not necessary since a full appreciation of the three-dimensional characteristics of a figure may be had without perspective. The inclusion of perspective by use of electronic multipliers and the like is fully contemplated and may be incorporated under the teachings herein.

The method and apparatus described herein are by no means limited to use with analog computers, but may be used wherever a plurality of voltages is available, which voltages can be represented by a three-dimensional figure. It should be understood that the apparatus can be utilized also to give a two-dimensional figure and is completely comprehensive in that either two or three-dimensional pictures may be produced.

In the following claims various terms are used, which terms are not to be narrowly interpreted. As an example, instead of using electronic tubes, junction transistors and the like may be used, which transistors are considered to be the equivalent of electronic tubes. Thus, also a magnetically-controlled or electrostatically-controlled cathode-ray tube may be used. Several types of stereoscopic systems may be used and it is intended that these various systems such as camera systems, mirror systems and lens systems are included in general terms such as stereoptic and stereoscopic systems. Various other equivalents will be obvious to those skilled in the art.

I claim:

1. The combination with means for presenting a three-dimensional representation of signal voltages whose simultaneous amplitudes respectively represent three related mathematical variables; of a resolver for altering said signal voltages to effect a rotation of said three-dimensional representation, said resolver comprising a first differential amplifier having an input terminal connected with one of said voltages and positive and negative output terminals, a first sine wave potentiometer connected across said output terminals of said first differential amplifier, a second differential amplifier having an input terminal connected with another of said voltages and positive and negative output terminals, a second sine wave potentiometer connected across the output terminal of said second differential amplifier, voltage-combining networks connected to said potentiometers, and means for connecting the third voltage and the said voltage-combining networks to said presenting means.

2. The combination with means for presenting a three-dimensional representation of signal voltages whose simultaneous amplitudes respectively represent three related mathematical variables; of a resolver for altering said signal voltages to effect a rotation of said three-dimensional representation, said resolver comprising a first differential amplifier having an input terminal connected with one of said component voltages and positive and negative output terminals, first rheostats connected across said output terminals of said first differential amplifier, a second differential amplifier having an input terminal connected with another of said component voltages and positive and negative output terminals, second rheostats connected across the output terminal of said second differential amplifier, a third differential amplifier having an input terminal connected to a third one of said component voltages and positive and negative output terminals, third rheostats connected across the output terminals of said third differential amplifier, a fourth differential amplifier having input terminals connected to said first and second rheostats and positive and negative output terminals, fourth rheostats connected across the output terminals of said fourth differential amplifier, a first voltage-combining network connected to said first and second rheostats, second and third voltage-combining networks connected to said third and fourth rheostats, said rheostats having their effective resistance variable as a trigonometric function, and means for connecting said voltage-combining networks to said presenting means.

3. The combination with means for presenting a three-dimensional representation of signal voltages whose simultaneous amplitudes respectively represent three related mathematical variables; of a resolver for altering said signal voltages to effect a rotation of said three-dimensional representation, said resolver comprising a first differential amplifier having an input terminal connected with one of said component voltages and positive and negative output terminals, first rheostats connected across said output terminals of said first differential amplifier, a second differential amplifier having an input terminal connected with another of said component voltages and positive and negative output terminals, second rheostats connected across the output terminal of said second differential amplifier, a third differential amplifier having an input terminal connected to a third of said component voltages and positive and negative output terminals, third rheostats connected across the output terminals of said third differential amplifier, a fourth differential amplifier having input terminals connected to said first and second rheostats and positive and negative output terminals, fourth rheostats connected across the output terminals of said fourth differential amplifier, a fifth differential amplifier having input terminals connected to said first and second rheostats and positive and negative output terminals, fifth rheostats connected across the output terminals of said fifth differential amplifier, a sixth differential amplifier having input terminals connected to said third and fourth rheostats and positive and negative output terminals, sixth rheostats connected across the output terminals of said sixth different amplifier, a first voltage combining network connected to said third and fourth rheostats, second and third voltage-combining networks connected to said fifth and sixth rheostats, said rheostats having their effective resistance variable as a trigonometric function, and means for connecting said voltage-combining networks to said presenting means.

4. The combination with means for presenting a three-dimensional representation of signal voltages whose simultaneous amplitudes respectively represent three related mathematical variables, of resolver means connected to receive said signals and including means for varying sine and cosine components of two of said signals simultaneously, means for combining said components to form first and second composite quantities, means for varying the sine and cosine components of the third signal and of said first composite quantity simultaneously, means for combining said latter components to form third and fourth composite quantities, means for varying the sine and cosine components of said second and fourth composite quantities simultaneously, and means for combining said last-mentioned components to form fifth and sixth composite quantities, said third, fifth, and sixth composite quantities providing a three-dimensional representation that corresponds to the original three-dimensional representation rotated in accordance with Euler's transformation equations.

5. The combination with means for presenting a three-dimensional representation of signal voltages whose simultaneous amplitudes respectively represent three related mathematical variables wherein two of said signals represent coplanar coordinates of said representation and the third signal represents the depth coordinate of said representation, said presenting means having a known convergence characteristic and including mixer means for combining said third signal with at least one of said two signals for establishing a pair of two-dimensional presentations in a single plane, said presentations being differently displaced along an axis in said plane that is common to both of said presentations; of a differential amplifier having an input terminal connected with said third signal and positive and negative output terminals connected to said mixer means, and means biasing said amplifier adjacent the saturation end of its characteristic curve to cause the characteristic curve of the amplifier to match the convergence characteristic of said presenting means so that the output of said differential amplifier varies in respect to the input in the same manner as the change in the displacement of said presentations varies in respect to the apparent change of the distance of the three-dimensional representation from an observer.

6. The combination with means for presenting a three-dimensional representation of signal voltages whose simultaneous amplitudes respectively represent three related mathematical variables wherein two of said signals represent coplanar coordinates of said representation and the third signal represents the depth coordinate of said representation, said presenting means having a known convergence characteristic and including a first mixer combining one of said two signals and said third signal in additive relationship and a second mixer for combining said one signal and said third signal in subtractive relationship for establishing a pair of two-dimensional presentations in a single plane, one of said presentations being controlled by the other of said signals and the output signal from said first mixer, and the other of said presentations being controlled by said other signal and the output of said second mixer such that said presentations are differently displaced along an axis common to both of said presentations; of a differential amplifier having an input terminal connected with said third signal and positive and negative output terminals connected to said first and second mixers respectively.

7. The combination with means for presenting a three-dimensional representation of signal voltages whose simultaneous amplitudes respectively represent three related mathematical variables wherein two of said signals represent coplanar coordinates of said representation and the third signal represents the depth coordinate of said representation, said presenting means having a known convergence characteristic and including a first mixer combining one of said two signals and said third signal in additive relationship and a second mixer for combining said one signal and said third signal in subtractive relationship for establishing a pair of two-dimensional presentations in a single plane, one of said presentations being controlled by the other of said signals and the output signal from said first mixer, and the other of said presentations being controlled by said other signal and the output of said second mixer such that said presentations are differently displaced along an axis common to both of said presentations; of a differential amplifier having an input terminal connected with said third signal and positive and negative output terminals connected to said first and second mixers respectively, and means biasing said amplifier adjacent the saturation end of its characteristic curve to cause the characteristic curve of the amplifier to match the convergence characteristic of said presenting means so that the output of said differential amplifier varies in respect to the input in the same manner as the change in the displacements of said presentations varies in respect to the apparent change of the distance of the three-dimensional representation from an observer.

8. The combination with means for presenting a three-dimensional representation of signal voltages whose simultaneous amplitudes respectively represent three related mathematical variables wherein two of said signals represent coplanar coordinates of said representation and the third signal represents the depth coordinate of said representation, said presenting means having a known convergence characteristic and including mixer means for combining said third signal with at least one of said two signals for establishing a pair of two-dimensional presentations in a single plane, said presentations being differently displaced along an axis in said plane that is common to both of said presentations; of means having an input connected with said third signal and an output connected to said mixer means and variably controlling the magnitude of said third signal for changing the apparent distance of the three-dimensional representation.

9. In a system for presenting a three-dimensional representation of three variable electrical quantities whose simultaneous amplitudes respectively represent three related mathematical variables, the method of forming and simultaneously varying sine and cosine components for two of said quantities and combining said components in accordance with Euler's transformation equations to form two composite quantities such that said two composite quantities and said third electrical quantity provide a three-dimensional representation that corresponds to the original three-dimensional representation rotated about a single axis.

10. In a system for presenting a three-dimensional representation of three variable electrical quantities whose simultaneous amplitudes respectively represent three related mathematical variables, the method of forming and simultaneously varying sine and cosine components for two of said electrical quantities and combining said components in accordance with Euler's transformation equations to form first and second composite quantities, forming and simultaneously varying sine and cosine components of said third electrical quantity and said first composite quantity and combining said last-mentioned components in accordance with Euler's transformation equations to form third and fourth composite quantities and forming and simultaneously varying sine and cosine components of said second and fourth composite quantities simultaneously and combining said last-mentioned components in accordance with Euler's transformation equations to form fifth and sixth composite quantities such that said third, fifth and sixth composite quantities provide a three-dimensional representation that corresponds to the original three-dimensional representation rotated in accordance with Euler's transformation equations.

11. The combination with means for presenting a three-dimensional representation of signal voltages whose simultaneous amplitudes respectively represent three related mathematical variables, of resolver means connected to receive two of said signal voltages and including means for forming and simultaneously varying sine and cosine components of said two signal voltages and means for combining said components to form first and second composite quantities and means connecting said first and second composite quantities and the remainder of said signal voltages to said presenting means for providing a three-dimensional representation that corresponds to the original three-dimensional representation rotated about a single axis in accordance with Euler's transformation equations.

References Cited in the file of this patent

UNITED STATES PATENTS

| | | |
|---|---|---|
| 2,301,826 | Steüdel et al. | Nov. 10, 1942 |
| 2,313,978 | Toepfer | Mar. 16, 1943 |
| 2,344,296 | Frink | Mar. 14, 1944 |
| 2,515,339 | Doherty | July 18, 1950 |
| 2,540,121 | Jenks | Feb. 6, 1951 |
| 2,543,793 | Marks | Mar. 6, 1951 |
| 2,548,900 | Lester | Apr. 17, 1951 |
| 2,561,612 | Culver | July 24, 1951 |
| 2,564,300 | Culver et al. | Aug. 14, 1951 |
| 2,578,970 | Gannaway | Dec. 18, 1951 |
| 2,583,469 | Chun | Jan. 22, 1952 |
| 2,590,230 | Castle | Mar. 25, 1952 |
| 2,665,335 | Cahen | Jan. 5, 1954 |
| 2,718,000 | Sunstein | Sept. 13, 1955 |

OTHER REFERENCES

Publication I—MIT Radiation Laboratory Series, "Vacuum Tube Amplifiers," Published by McGraw-Hill, N. Y., October 1948. Page 450, Figs. 11–30. (Copy in Div. 69.)